United States Patent [19]

Bissett

[11] Patent Number: 5,771,762
[45] Date of Patent: Jun. 30, 1998

[54] QUICK-COUPLING FACE-DRIVER ASSEMBLY OF A ROTARY DRIVE DEVICE AND METHOD FOR CHANGING FACE DRIVERS

[76] Inventor: Kevin J. Bissett, 1773 Milldrum St., Union Grove, Wis. 53182

[21] Appl. No.: 629,192

[22] Filed: Apr. 8, 1996

Related U.S. Application Data

[63] Continuation of Ser. No. 236,498, Apr. 29, 1994, abandoned.

[51] Int. Cl.⁶ ......................................................... B23B 3/00
[52] U.S. Cl. ............................. 82/1.11; 82/142; 82/151; 82/160; 82/166; 82/170; 142/53; 409/232; 409/233
[58] Field of Search ............................ 82/1.11, 142, 150, 82/151, 160, 165, 166, 170, 903; 142/53; 279/143; 409/233, 232

[56] References Cited

U.S. PATENT DOCUMENTS

| | | |
|---|---|---|
| 3,177,775 | 4/1965 | Alisauskis . |
| 3,308,696 | 3/1967 | La Marca ................................. 82/150 |
| 3,422,709 | 1/1969 | Rees ......................................... 82/150 |
| 4,307,797 | 12/1981 | Belansky . |
| 4,604,009 | 8/1986 | Tennerstedt ............................. 409/233 |
| 4,632,614 | 12/1986 | Rall et al. ................................ 409/233 |
| 4,655,655 | 4/1987 | Schurfeld ................................ 409/232 |
| 4,662,043 | 5/1987 | Stone et al. ............................... 29/33 P |
| 4,772,163 | 9/1988 | Scheen et al. ........................... 409/232 |
| 4,890,522 | 1/1990 | Nader et al. .............................. 82/165 |
| 4,919,023 | 4/1990 | Bloink . |
| 4,919,574 | 4/1990 | Samyn ...................................... 409/219 |
| 4,958,968 | 9/1990 | Von Haas et al. ....................... 279/143 |
| 4,971,339 | 11/1990 | Treff ............................................ 279/4 |
| 4,986,704 | 1/1991 | Narushima et al. ..................... 409/233 |
| 5,325,749 | 7/1994 | Peris et al. ................................. 82/142 |
| 5,407,308 | 4/1995 | Takayoshi ............................... 409/232 |
| 5,626,448 | 5/1997 | Huang et al. ........................... 409/233 |

FOREIGN PATENT DOCUMENTS 3427124  1/1985  Germany ................................. 82/160

OTHER PUBLICATIONS

Madison Sales Bulletin, FD–86–100, 7–86 10M.
Max–Grip, Inc. LEV'R–LOK Chucks, Catalog 101.3.
ITW Woodworth, QCS Tool Holder Systems.
Advanced Machine & Engineering Co., OTT Product Information, Gripper Units . . . Retention Knob.

Primary Examiner—Steven C. Bishop
Assistant Examiner—Christopher Kirkman
Attorney, Agent, or Firm—Jansson, Shupe, Bridge & Munger, Ltd.

[57] ABSTRACT

A face-driver assembly and method for accurate coupling of a face driver with the spindle of a rotary-drive machining device. The assembly includes a face driver, a hub on the spindle defining a prealignment bore, a pair of self-centering coacting tooth sets on the hub and face driver, an engagement post extending into the hub and forming a prealignment shaft closely complementary to the prealignment bore, and a releasable coupling to hold and draw the engagement post rearwardly and thereby join the tooth sets in a manner facilitating final accurate centering.

16 Claims, 5 Drawing Sheets

QUICK-COUPLING FACE-DRIVER ASSEMBLY OF A ROTARY DRIVE DEVICE AND METHOD FOR CHANGING FACE DRIVERS

RELATED APPLICATION

This application is a continuation of patent application Ser. No. 08/236,498, filed on Apr. 29, 1994, entitled "Quick-Change Tool Adapter," now abandoned.

FIELD OF THE INVENTION

The invention relates to face-driver assemblies of rotary-drive machining devices and, more particularly, to coupling of face drivers with rotary-drive machining devices and methods for changing face drivers in such machining devices.

BACKGROUND OF THE INVENTION

Many metalworking machines are (or employ) rotary drive devices which rotate workpieces (often shaft-like pieces) at locations permitting metalworking operations to be performed on the workpieces a s they rotate. Such machines include lathes, gear-shaping tools, hobbing tools, spline-milling tools and grinding tools.

Workpieces are typically supported in such machines by chucks, driving dogs or face drivers on one end and a tailstock on the other—clamped between such mounting structures. The workpiece is held there and rotated about the axis defined by such apparatus as the intended machining (metalworking) operations are carried out.

Chucks and driving dogs use claws or clamps to grasp the outer radial periphery of the workpiece. This requires that the end portions of workpieces either be machined before or after machining of the principal portions of the workpieces, or that end portions of the workpieces be removed after machining of the principal portions.

Face drivers, on the other hand, apply forces only to the end faces of the workpieces, thereby permitting metalworking operations to be performed along the entire axial length of a workpiece in a single operation. Because of this, face drivers are usually preferred for use in machines performing metalworking operations along the entire axial length of a workpiece. Face drivers are commercially available, e.g., from the Madison Face Driver Company,-a division of Speed-Grip, Inc., Elkhart, Ind.

In this document, the term "face driver" refers to the unit dedicated to engagement to workpiece itself, i.e., to the workpiece end. Such term is further illuminated in the next paragraph. In contrast, the term "face-driver assembly" refers to the face driver together with the axially-aligned apparatus by which the face driver is coupled with and secured to the spindle of the rotary-drive machining device.

A face driver typically has a forward portion to engage the end of a workpiece and a rearward portion made for coupling with the rotary-drive machining device (e.g., lathe). Each face driver includes a carrier body (or "driving head") and, projecting forwardly therefrom, an axial center point member and plurality of drive pins spaced therearound to engage and turn the workpiece as the face driver rotates. The drive pins are adjustably held in drive-pin holes in the carrier body and are rearwardly supported by a compensating medium—typically either an elastomer ring or hydraulic fluid. The compensating medium, of course, permits each drive pin to adjust to irregular face variations of the workpiece end.

A face driver coupled with a rotary-drive machining device (e.g., lathe) must be replaced with another face driver as necessary during retooling to accommodate a different workpiece. Such face-driver replacement is required whenever the new workpiece is of a size (e.g., diameter) which makes the already-installed face driver (i.e., the one coupled with the rotary drive device for the last machining operation) unacceptable for the new workpiece.

Some face drivers are of the so-called dual-range type, which include two concentric sets of drive-pin holes in the carrier body, enabling the face driver to accommodate a broader range of workpiece diameters than would otherwise be possible. However, despite such innovation, different workpiece sizes and operations often require installation of different face drivers on the lathe or other rotary-drive machining device. Replacement of one face driver with another takes time and needs to be done accurately.

Thus, the apparatus and method for coupling the face drivers—i.e., the rearward portions thereof—with the rotary-drive machining device become matters of great importance. More particularly, the speed and accuracy of the coupling operation and arrangement have a direct impact on the efficiency and accuracy of machining operations. Productivity of machining operations is negatively affected to the extent that changing face drivers delays the resumption of either individual or repetitive machining operations.

Difficulties in face-driver centering exacerbate changeover problems and extend changeover time, and may also negatively affect production quality. In certain coupling arrangements of the prior art, centering of face drivers vis-a-vis spindles of the rotary-drive machining devices is often a painstaking and delicate process, even if it is performed by highly-skilled machinists. Long set-up times and changeover times are undesirable. They are most harmful to production efficiency in situations in which relatively small numbers of parts are produced in machining runs—because a relatively higher percentage of available time is taken by face-driver replacement operations.

A number of face-driver coupling arrangements have been used. Each, however, has significant shortcomings and/or problems associated with it.

One prior face-driver coupling arrangement (or "face-driver assembly") is called a tapered-shank mount. A tapered-shank mount is characterized by the rearward portion of the face driver having a long tapered shank which, in face-driver mounting, is inserted into a long spindle member which forms part of the rotary drive device until in frictional engagement therewith. Such tapered shanks are typically 10–16 inches in axial length; such deep insertion is intended both to firmly engage the face driver with the spindle and to provide centering of the face driver vis-a-vis the spindle.

Tapered-shank mounts have significant drawbacks and pose significant problems for mounting or changing face drivers:

For one thing, such coupling arrangements use a great deal of axial space for mounting a face driver—thus taking up axial space otherwise available for longer workpieces in the rotary-drive machining device. Such coupling arrangements, therefore, limit the versatility of such the rotary-drive machining devices, which are typically very expensive pieces of equipment.

After use, removing face drivers having tapered-shank mounts is often time-consuming and difficult. Significant force is required to dislodge the tapered shank from its deep insertion in the spindle, the female member of such friction mount. In some cases, such as after long use of a face driver in a long production run, it becomes necessary or expedient to use a sledge hammer and rod to dislodge the tapered shank from the spindle. This and other force applied during removal can damage tapered surfaces. Other damage, such as torque damage, can occur to shank mounts.

At least as important is the fact that mounting of such a face driver—i.e., by insertion of the tapered shank into the spindle member—can often provide inaccurate centering. While longer axial dimensions of shank and spindle tend to lessen inaccuracy problems, lengthening the shank and spindle further limits the axial space available for workpieces in the rotary-drive machining device and exacerbates face-driver removal problems. Accurate centering is made more difficult by any damage which has occurred to the male and female parts of a tapered-shank mount.

Finally, it should be noted that with tapered-shank mounts fine adjustment, such as set-screw adjustment, is typically unavailable. Thus, centering by mounting and remounting is something of a time-consuming hit-or-miss operation.

Another prior face-driver coupling arrangement (or "face-driver assembly") is a chuck mount. In such arrangements, the jaw members (typically three) of an external-actuating chuck engage the lateral surfaces of the rearward portion of the face driver, and hold it in place.

Chuck mounting of face drivers causes significant problems which retard the efficiency and accuracy of machining operations:

Like tapered-shaft mounts, chuck mounting takes up a great deal of axial space—space which is otherwise usable to allow for longer workpieces in a rotary-drive machining device. A typical face-driver mounting chuck is about 8–14 inches in axial dimension.

Furthermore, because of the nature of a chuck and the movement control for each of the chuck jaws, highly accurate centering of workpieces is problematic. When remounting is necessary after a mounting attempt is seen (e.g., after checking with a centering indicator) to have resulted in an off-center mount, it may even be necessary to rebore (i.e., to machine) the chuck jaws.

Proper mounting also typically requires that insertion of the face driver into the chuck be after locating one of the jaws in a "down" position when the chuck is open, in order to avoid a pinching of chuck jaw edges which exacerbates off-center problems when the chuck is closed. In some cases, it is even necessary to remove one jaw in order to insert the face driver.

Thus, it can be seen that face-driver coupling by chuck mounting is a fairly complex process, and is a process which is further complicated by the centering problems which are likely to occur.

Another prior face-driver coupling arrangement (or face-driver assembly) can be referred as a multi-bolt flange mount. In such coupling arrangements, the rearward portion of the face driver is a flange having a plurality of axially-parallel holes spaced thereabout which receive coupling bolts. Such bolts are used to secure the face driver to a spindle nose adapter secured to the spindle. The rear surface of the rearward portion of the face driver typically is complementary to the surface of the adapter—forming a cylindrical space configured to receive a generally complementary cylindrical forward portion of the adapter. Radial centering screws are included in the rearward portion of the face driver to allow adjustment of the face driver to the true axis of the spindle.

Flange mounting of face drivers, while leaving more axial space (than tapered-shank mounts or chuck mounts) free for workpiece mounting, poses significant problems for mounting or replacing face drivers:

Face-driver replacement using flange mounting is very time-consuming. It involves loosening of radial centering screws and loosening and removal of the bolts (typically six) which extend through the flange and into the adapter to remove the face driver which had been in use, and then reverse operations on such members to attach the replacement face driver.

Bolt alignment problems can occur because the receiving holes in the adapter are covered by the face driver during the mounting operation. Once engaged, proper bolt sequencing (in tightening) is important. The bolts must be torqued properly before centering in order to achieve accuracy. A dial indicator is used to determine proper centering, which is carried out by adjustment of the radial centering screws. Final bolt tightening then completes the operation. In some cases, such as when a replacement face driver is of dimensions very different from those of the face driver being replaced, it may also be necessary to secure a different spindle nose adapter to the spindle before mounting the replacement face driver.

While centering of face drivers is possible using flange mounting, it is far from easy or automatic. And, each time a face driver is replaced with another face driver, the same complex removal, attachment, partial tightening, centering-screw adjustment and final bolt tightening steps must be repeated until an acceptably centered mounting is completed.

Thus, flange mounting is a far-from-satisfactory means of coupling face drivers with the rotary-drive machining devices on which they are used.

In summary, none of the old-style face-driver mounting arrangements—the tapered-shank mounts, the chuck mounts or the flange mounts—provides an acceptable combination of quick and easy mounting, axial space, and centering accuracy. Face-driver mounting in rotary-drive machining devices remains a significant problem which requires new and inventive solutions.

OBJECT OF THE INVENTION

It is an object of this invention to provide an improved face-driver assembly overcoming some of the problems and shortcomings of the prior art, including those mentioned above.

Another object of the invention to provide an improved, quick-coupling face-driver assembly requiring minimal time for coupling with a rotary-drive machining device and minimal time for face-driver replacement.

Another object of the invention to provide an improved method for changing face drivers, which reduces downtime of machining operations using rotary-drive machining devices.

Another object of the invention is to provide an easy-mounting face driver which assures proper centering of the face driver on the axis of the rotary drive device.

Another object of the invention is to provide an improved self-centering face-driver coupling arrangement which allows accurate mounting of face drivers even by workers who are not highly skilled.

Still another object of the invention is to provide an improved apparatus for machining rotating workpieces which is subject to less downtime during any changeover in the size of the workpieces to be machined.

Yet another object of the invention is to eliminate the need for complex manipulative steps in changing face drivers on a rotary-drive machining device.

Another object of the invention is to eliminate the need for repetitive steps or a trial-and-error approach in centering a face driver on the axis of a rotary drive machining device.

Another object of this invention is to help assure the accuracy of machining operations in production by facilitating accurate centering of face drivers on the spindles of rotary-drive machining devices.

These and other important objects will be apparent from the descriptions of this invention which follow.

BRIEF SUMMARY OF THE INVENTION

This invention is a face-driver assembly and method for changing face drivers with overcome the problems and deficiencies mentioned above.

The face-driver assembly of this invention allows very quick, easy and highly accurate mounting of a face driver on a rotary-drive machining device, such as a lathe. This invention allows fast and highly accurate changing of face drivers, so that production machining operations can quickly resume after a changeover from workpieces of one size to workpieces of a different size. Changeovers can be accomplished is seconds.

This invention overcomes concerns about inaccurate centering and avoids delays from centering problems upon face-driver mounting. Furthermore, with this invention, face drivers can readily be changed by workers who are not highly skilled.

The face-driver assembly in accordance with this invention includes: a hub on the spindle, such hub defining what is referred to herein as a prealignment bore (or prealignment receptacle); a pair of annular, self-centering coacting tooth sets on the hub and face driver; an engagement post which extends rearwardly from the face-driver and forms a prealignment shaft, such prealignment shaft and the prealignment bore being closely complementary (as defined below); and inter-engageable means on the hub and engagement post to releasably hold and draw the engagement post rearwardly.

As used herein, "closely complementary" means having similar axial cross-sectional shapes such that, upon insertion of the prealignment shaft into the prealignment bore, the first step in starting the coupling of the face driver with the rotary-drive machining device, the prealignment shaft is readily insertable into the prealignment bore without tool assistance, but leaving little or no visible off-axis play after insertion. There may be slight off-axis play, but prealignment shaft and prealignment bore are sized such that their initial easy engagement gives a prealignment which reliably succeeds in facilitating appropriate meshing of the two self-centering tooth sets —meshing which then provides final accurate centering.

Thus, these parts and structures cooperate to join the tooth sets in a manner assuring that the coacting tooth sets provide final self-centering to axially align the face driver with the spindle. The engagement of the tooth sets also serves to provide transmission of torque to the workpiece, through the face driver.

The engagement post has multiple interactions and functions in cooperating with the other parts and structures to carry out quick and highly-accurate face-driver coupling. The sequencing and timing of such interactions and functions, and the structural requirements to achieve them, provide coupling which is many times quicker than with equipment of the prior art and highly accurate. Such interactions put structures in relative positions assuring that proper self-centering will occur.

In certain preferred embodiments, the face-driver tooth set is on an adapter ring which is secured to the face-driver rear end and which is pre-centered on the face driver. Precentering is by adjustment using a plurality of pre-centering adjustment screws extending radially through the face driver to engage the outer periphery of the adapter ring. After pre-centering, however, no further adjustment is typically required. Mounting and removal of face drivers proceeds without concern for adjustment of the position of the adapter ring on its face plate.

In preferred embodiments, the holding/drawing means on the engagement post is a retention knob at the end of the engagement post, and the holding/drawing means on the hub includes a jaw-type chuck for releasable engagement with the retention knob.

The spindle of the rotary-drive machining device includes a spindle drawbar and hydraulic actuator, and the chuck is preferably secured to the spindle drawbar to be axially movable by the hydraulic actuator during coupling and uncoupling of the face-driver assembly.

Referring again to the engagement post, the portion of the engagement post called the prealignment shaft is adjacent to the face-driver rear end. Most preferably, the holding/drawing means on the engagement post is positioned to the rear of the prealignment shaft. The holding/drawing means on the engagement post, as later detailed, is preferably a retention knob forming the rear end of the engagement post.

The spindle of the rotary-drive machining device, in addition to the spindle parts already mentioned, includes a spindle drive tube which has a front end to which the aforementioned hub is attached. In preferred embodiments of this invention, the hub preferably includes an annular hub front portion which engages the drive-tube front end, and a center hub recess portion extending rearwardly from the hub front portion to serve various functions.

In preferred embodiments, the hub recess portion has a stepped axial bore for receiving the engagement post which extends from the face driver. The stepped bore includes (a) a bore front portion which is the prealignment bore (already mentioned) and (b) a bore rear portion. The bore front portion (or "prealignment bore") is substantially larger in diameter than the bore rear portion.

The prealignment bore is open at the hub front portion and is positioned to receive the prealignment shaft. Insertion of the prealignment shaft portion (of the engagement post) into the prealignment bore is carried out manually because of a less-than-very-tight nature of the complementary configurations (as described above). The prealignment bore is deep enough so that the prealignment shaft never "bottoms out" in it.

The smaller-diameter bore rear portion is rearward of and adjacent to the prealignment bore. The bore rear portion is configured (i.e., sized) to receive the holding/drawing means of the engagement post. The holding/drawing means of such engagement post, in its preferred form, is a retention knob at the end of the engagement post, as already noted. The retention knob is axially movable in the stepped bore, including in the bore rear portion.

In preferred embodiments, the holding/drawing means on the hub is a jaw-type chuck for releasable engagement with the retention knob. The chuck is configured for insertion into the stepped bore, including the bore rear portion. The chuck, bore rear portion and retention knob are configured and arranged such that the chuck (a) closes onto the retention knob as the chuck moves into the bore rear portion, (b) is held closed by its confinement within the bore rear portion, and (c) opens under the action of a chuck spring part as the chuck moves from the bore rear portion into the prealignment bore. In preferred embodiments of the invention, the chuck is secured to the aforementioned spindle drawbar and is axially movable by the hydraulic actuator during coupling and uncoupling operations, thereby further facilitating such operations.

In one broad description, the face-driver assembly of this invention includes: a face driver: a pair of self-centering tooth sets, one secured with respect to the face-driver rear end and the other secured with respect to the spindle; a closely-complementary prealignment member and prealignment receptacle, one secured with respect to the face-driver rear end and the other with respect to the spindle; and releasably interengageable means, including one portion secured with respect to the face-driver rear end and a second portion secured with respect to the spindle. Such combination of elements releasably holds and draws the face driver rearwardly after the prealignment member is inserted into the prealignment receptacle, so that the two tooth sets are joined in a manner facilitating final accurate face-driver centering and torque transmission.

The method of this invention for changing face drivers involves use of such face-driver assembly, and includes the following steps: disengaging the first coupling means from the second coupling means of a first face driver (i.e., the face driver being removed); then withdrawing the engagement post from the hub in removing the first face driver; then inserting the engagement post of a second face driver (i.e., the face driver to be used) into the hub by inserting the prealignment shaft of such face driver into the prealignment bore, thereby to prealign the second face driver with the spindle; then engaging the first coupling means with the second coupling means of a second face driver; and finally drawing the engagement post rearwardly to join the coacting tooth sets in a manner facilitating final accurate centering of the second face driver on the spindle axis.

It is preferred that the disengagement, engagement and rearward drawing steps include actuating a hydraulic actuator and drawbar of the spindle to axially move the first and second coupling means.

In certain of the descriptions of this invention which follow, the aforementioned adapter ring and hub, and their related parts, are referred to as a two-part adapter. The two parts involved are those secured to the face driver and those secured with respect to the spindle.

DETAILED DESCRIPTION OF PREFERRED EMBODIMENT

Figure 1:
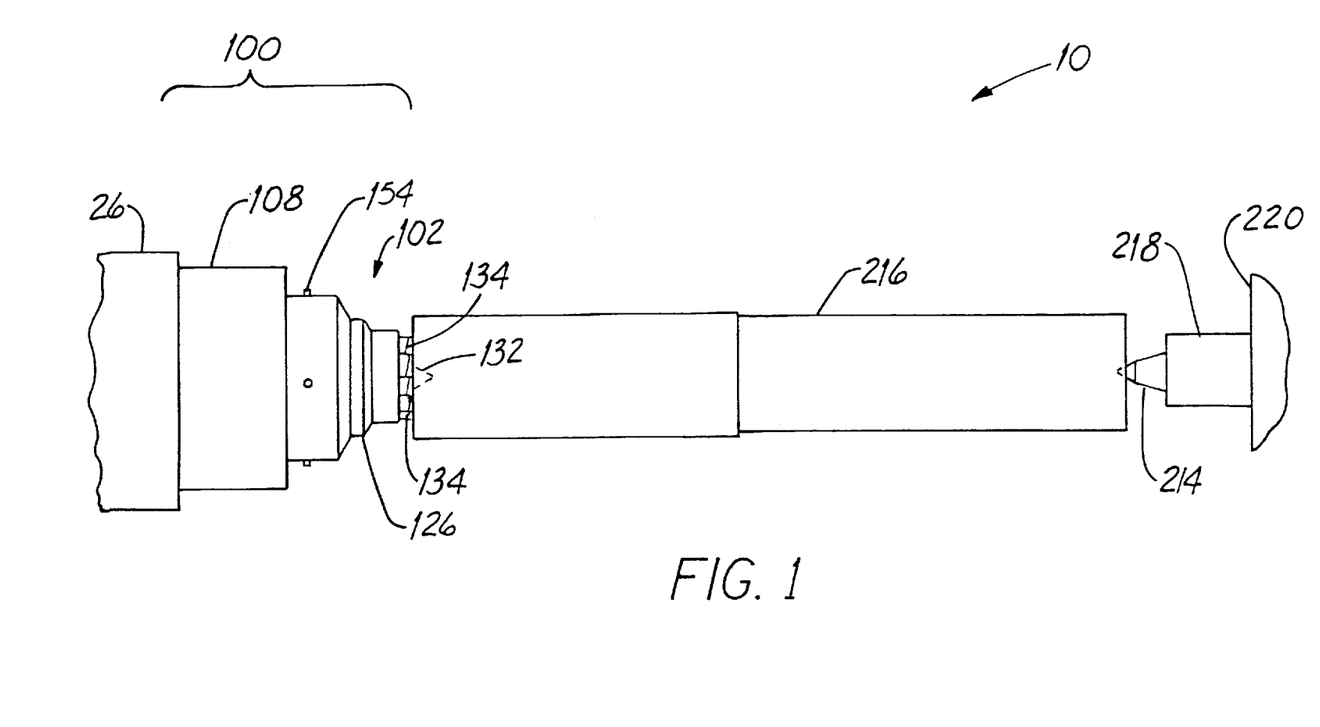
FIG. 1 is a schematic fragmentary top plan view of a rotary-drive machining device having a face-driver assembly in accordance with this invention and holding a workpiece in place.

FIG. 1 schematically illustrates the invention in its place of use. A rotary-drive metalworking device, in this case a lathe 10, includes a spindle assembly 26, a face-driver assembly 100, and a tailstock 214 spaced from face-driver assembly 100 so as to support a workpiece 216 for turning and machining on lathe 10.

Spindle assembly 26 is mounted on a support (not shown). Tailstock 214 is mounted on a piston 218 which is in turn mounted for reciprocal motion on tailstock support 220. Workpiece 216 is removably clamped between face-driver assembly 100 and tailstock 214 by the action of piston 218 for machining, and is released after machining is completed.

Face-driver assembly 100 includes a face driver 102 and, attached to spindle assembly 26, an axially-aligned adapter apparatus 108. Adapter apparatus 108 supports face driver 102 and is mounted on spindle assembly 26 by means not shown in FIG. 1.

Face driver 102 includes a carrier body 126, a spring-loaded centerpoint 132 and a plurality of drivepins 134, as in face drivers of the prior art. Centerpoint 132 and drivepins 134 extend forwardly from the front face of carrier body 126 to engage the rear face of workpiece 216. These parts function in the manner described above in connection with the prior art. Inner configurations and parts, including the aforementioned compensating medium, are not shown in the drawings.

FIGS. 2–7 illustrate face-driver assembly 100 (and also spindle assembly 26) in much greater detail, showing details of a preferred embodiment of the invention. Spindle assembly 26 includes what will be referred to herein as a spindle drive tube 106, a spindle drawbar 172, and an axially-movable rod 124 connecting drawbar 172 to its hydraulic actuator 104. Face-driver assembly 100 includes, in addition to face driver 102, two-part adapter apparatus 108, and a quick-connect coupling denoted generally at 110 in FIGS. 2–4.

Figure 2:
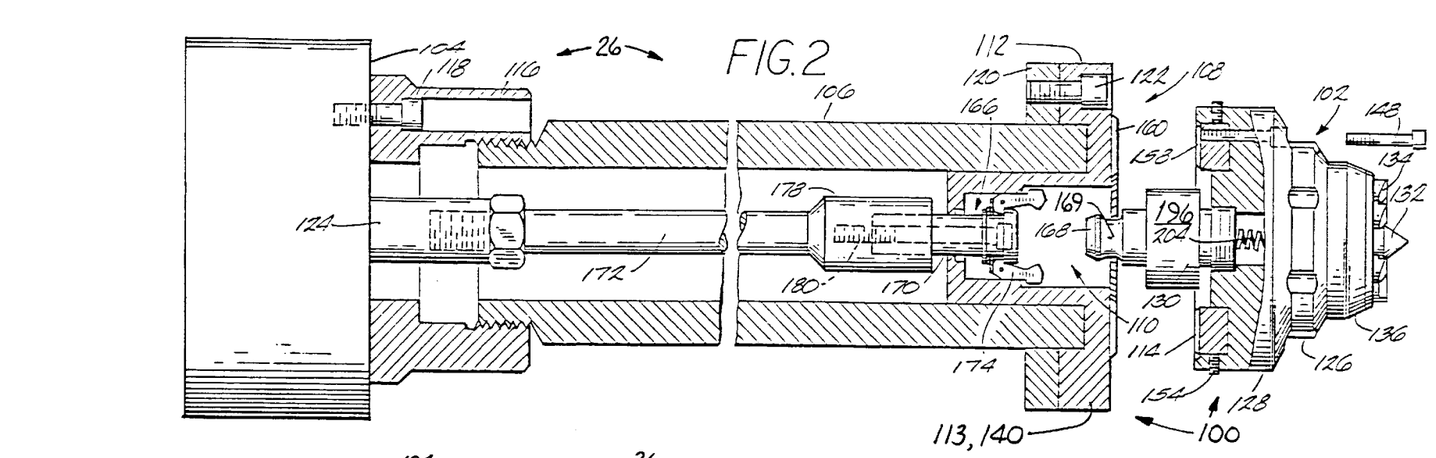
FIGS. 2 and 3 are sectional side elevations of a face-driver assembly in accordance with this invention and showing the face driver in its detached and attached states, respectively.
Figure 3:
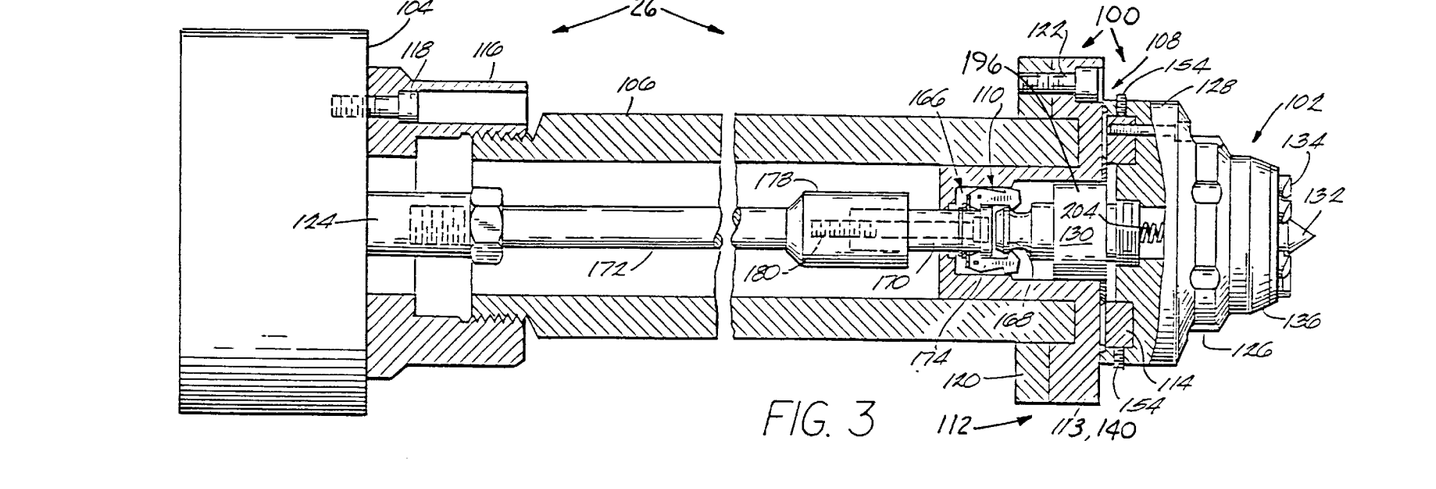
Figure 4:
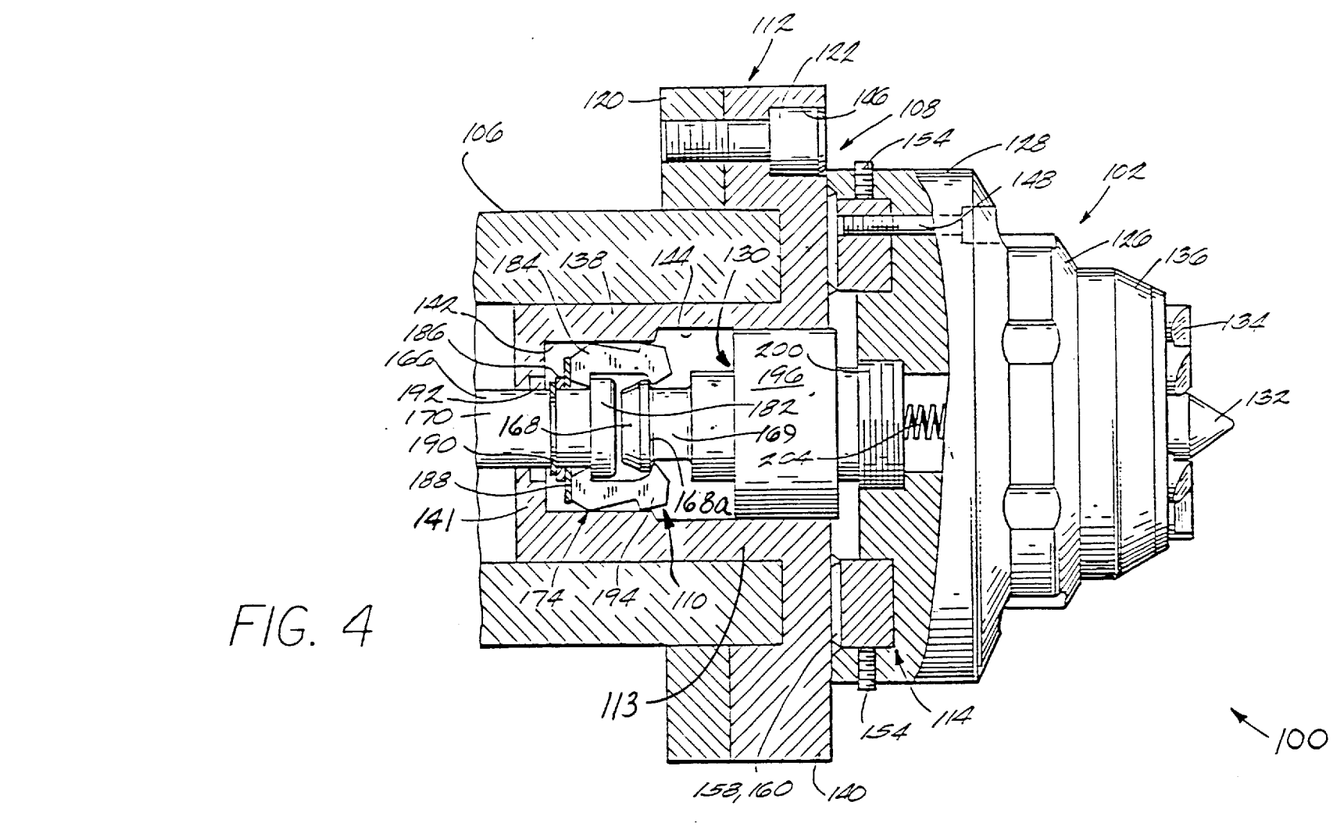
FIG. 4 is an enlarged view of the face driver and the adapter of the face-driver assembly of FIGS. 2 and 3, illustrating the face driver in coupled condition, with the adapter ring (which is one portion of the adapter) attached to the hub (which is another portion of the adapter), by means of the position and resulting closed condition of a chuck.
Figures 5, 6, 7:
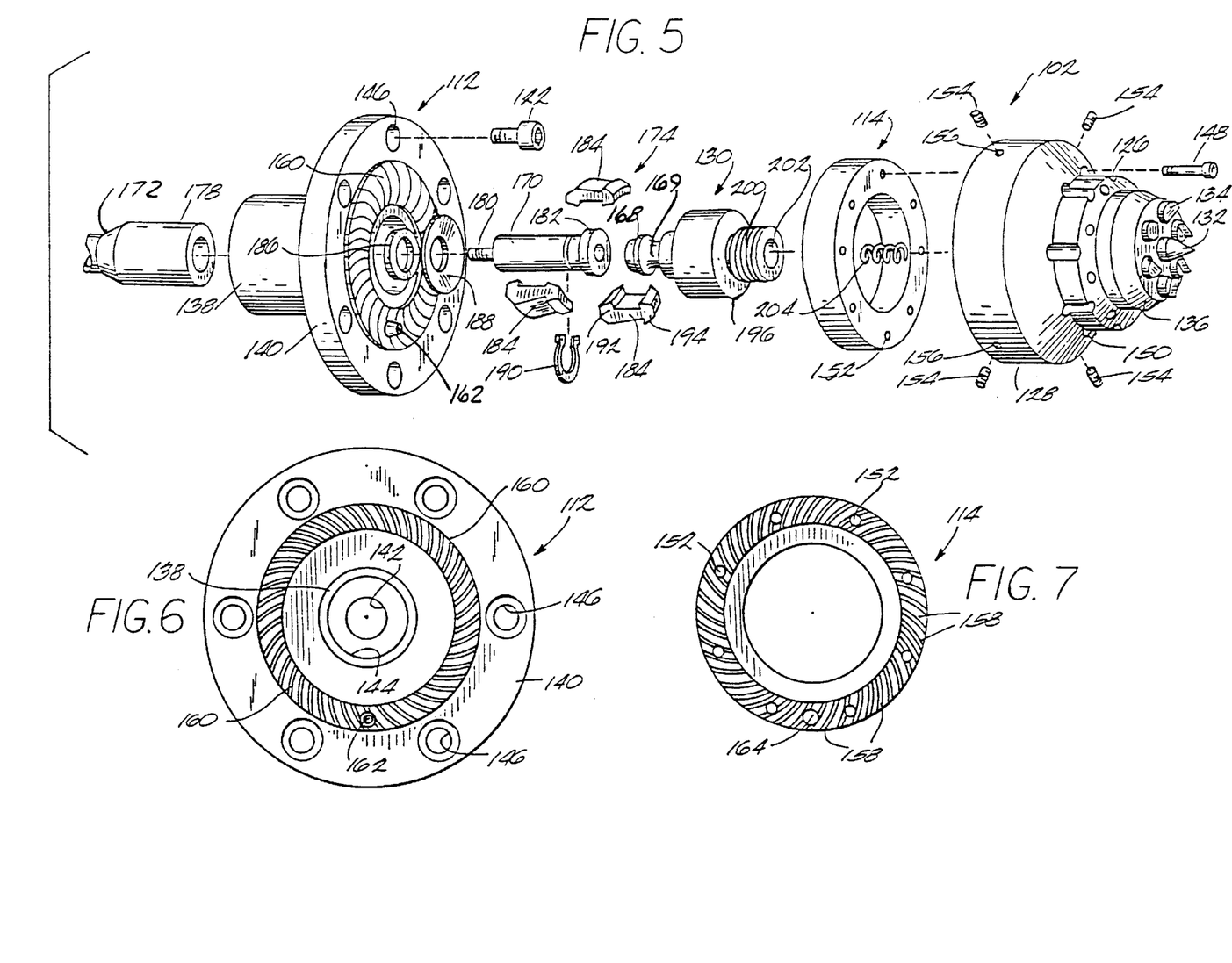
FIG. 5 is a partially-exploded perspective view of the face-driver assembly of FIG. 4.
FIG. 6 is a front elevation of the hub of the adapter of FIGS. 2–5.
FIG. 7 is a rear elevation of the adapter ring of the adapter of FIGS. 2–5.

Two-part adapter apparatus 108 includes a first portion 112 affixed to spindle drive tube 106, which drives it rotationally, and a second portion 114 affixed to face driver 102. First and second adapter portions 112 and 114 are engaged with one another in a precise concentric or coaxial relationship when face driver 102 is coupled in lathe 10.

Hydraulic actuator 104 and spindle drive tube 106 are conventional equipment. Hydraulic actuator 104 is bidirectional, and can move spindle drawbar 172 in either axial direction (upon activation by means of a foot pedal or other suitable device). Hydraulic actuator 104, drive tube 106 and drawbar 172 all rotate together. Spindle drive tube 106 is connected at its rear end to hydraulic actuator 104 via connector 116 and bolts 118. Spindle drive tube 106 is connected at its front end to first adapter portion 112 via a suitable clamp 120, to which first adapter portion 112 is secured by bolts 122.

Face driver 102, except for modifications discussed below, is as manufactured by Madison Face Driver Company and marketed as Madison's Tool Series 4262. Face driver 102 includes a carrier body 126 and a flange member 128. As noted with reference to FIG. 1, face driver 102, of course, also includes centerpoint 132 and drivepins 134. The forward end of carrier body 126 is capped by a conventional nose cap 136.

In this invention, an engagement post 130 extends axially from face driver 102 in a rearward direction. Flange member 128 is modified to have a recess configured to accommodate second adapter portion 114. The modifications are accomplished without increasing the overall axial length of the assembled face driver and adapter, as compared to face-driver flange-mount arrangements of the prior art. Rearwardly-extending engagement post 130 has characteristics, as detailed below, which, cooperating with the other apparatus described herein, allow both quick and accurately-centered coupling of face driver 102 in lathe 10.

Before describing the details of engagement post 130 and the structure with which it mates, first and second adapter portions 112 and 114 will be described in greater detail and at some length.

First adapter portion 112 includes a hub 113, which has an annular hub front portion 140 and a center and rearward annular hub recess portion 138 which terminates in hub rear wall 141 (see FIG. 4). A central stepped bore is formed in hub recess portion 138 in order to receive a chuck 166, which forms a part of quick-connect coupling 110. As illustrated most clearly in FIG. 4, the bore has a rear smaller diameter portion 142 and a front larger diameter portion 144 which extends from bore rear portion 142 to the front face of hub 113. (Such bore portions together are sometimes referred to herein as stepped bore 142/144.) A plurality of holes 146 are formed near the periphery of hub front portion 140 to receive bolts 122 for connection of hub 113 to drive tube clamp 120, as described above.

Second adapter portion 114 is an adapter ring (hereafter, "adapter ring 114"). Adapter ring 114 is received in the above-mentioned recess in the rear face of flange member 128 of face driver 102. It is bolted to flange member 128 by a plurality of bolts 148 which extend through holes 150 in flange member 128 and into threaded bores 152 in adapter ring 114.

Four centering screws 154 are spaced around the periphery of flange member 128 and extend through threaded bores 156 (see FIG. 5) in flange member 128 and into engagement with the outer periphery of adapter ring 114 in order to center face driver 102 on adapter ring 114. It is important to note that, in the device of this invention, such centering only need be performed once—when face driver 102 is initially connected to adapter ring 114. Changing face drivers to prepare for a new machining run typically would not require this centering adjustment, because each face driver would already have its own properly-connected adapter ring.

A pair of interengageable annular tooth sets, each set having a plurality of teeth, are on the rear face of adapter ring 114 and the front face of hub front portion 140 of hub 133. Driven teeth 158 are formed on adapter ring 114 and mesh with drive teeth 160 formed on hub front portion 140 when face-driver assembly 100 is in its coupled position as illustrated in FIGS. 3 and 4. The annular set of drive teeth 160 on hub 113, when fully engaged with the annular set of driven teeth 158 on adapter ring 114, serve to effectively and safely transmit the rotational torque of spindle drive tube 106 to face driver 102.

Such teeth and tooth sets are of configurations which effect self-centering of the sets (and, thus, of adapter ring 114 on hub 113 and, thus, of face driver 102 on lathe spindle assembly 26) when the annular tooth sets are axially drawn together, as occurs on coupling of the face-driver assembly of this invention. An acceptable configuration for such teeth and for such centering tooth sets is disclosed in U.S. Pat. No. 4,307,797 (Belansky), the disclosure of which is hereby incorporated by reference.

Accurate centering is facilitated by indexing of the interengaging tooth sets. This is accomplished by the mating of a dowel 162 which projects from one position along the set of drive teeth 160 on hub 113 with a dowel-receiving aperture 164 at one position along the set of driven teeth 158 in adapter ring 114. Upon mounting of face driver 102, such face driver is indexed manually to a position such that dowel 162 and dowel-receiving aperture will mate.

Another important aspect of the quick-coupling face-driver assembly of this invention is the manner in which face driver 102, with adapter ring 114 on it, is firmly, rapidly and accurately drawn axially onto hub 113—to engage the annular tooth sets for quick, reliably-centered mounting of face driver 102. This involves engagement post 130 and the structure with which engagement post 130 mates to form quick-connect coupling 110.

Rearwardly-extending engagement post 130 has a threaded front portion 200 for attachment to flange member 128. An axial bore 202 is formed in front portion 200 in order to receive spring 204, which serves to bias centerpoint 132 forwardly. In addition to these features, engagement post 130 has other features which are configured to carry out various functions related to quick and accurate coupling. More specifically, immediately to the rear of its threaded front portion 200, engagement post 130 has an enlarged, cylindrical middle portion which is referred to herein as a prealignment shaft 196. At the rear end of engagement post 130, and separated from prealignment shaft 196 by an annular groove 169, is a knob which is referred to herein as a retention knob 168. Retention knob 168 is defined in part by a forward shoulder 168a.

Before describing more specifically the function of prealignment shaft 196, it will be helpful to describe the function of retention knob 168. Retention knob 168 is removably engageable by a chuck 166 within stepped bore 142/144. Chuck 166 is within stepped bore 142/144 and operates based on its axial positioning by spindle drawbar 172 in stepped bore 142/144—by means of the configuration of chuck 166 and its interaction with the bore walls depending upon whether or not it is entirely within bore rear portion 142, the portion of smaller inner diameter.

The interaction of chuck 166 with retention knob 168 is illustrated best in FIGS. 2–5. Chuck 166 includes an actuating pin 170 which extends from within stepped bore 142/144, through an axial opening in hub rear wall 141 (see FIG. 4), to connection (by means of a bolt 180) with a receptacle end 178 of spindle drawbar 172. Actuating pin 170 has an enlarged head 182 at its front end. Enlarged head is adjacent to claws 184 of jaw 174. Claws 184 are spaced around the periphery of actuating pin 170 and held against it by a washer 186, a wave spring 188 and a snap ring 190. While eight claws 184 are spaced around actuating pin 170, for the sake of convenience only three are shown.

As shown in FIG. 4, each claw 184 of chuck 166 is generally J-shaped and has a claw tail 192 (to the rear) and a claw head.194 (to the front). Each claw tail 192 is seated on wave spring 188 and has an inner hook engaging a rearward shoulder on head portion 182 of actuating pin 170. Each claw head 194 has a similar hook for engaging forward shoulder 168a of retention knob 168.

The outer radial surfaces of claws 184 are shaped to cooperate with stepped bore 142/144 in hub 113 in the following known manner:

When chuck jaw 174 is pulled toward the rear of hub 113 by the action of spindle drawbar 172, so that claws 184 are captured within bore rear portion 142, claws 184 pivot inwardly to capture retention knob 168, with the hooks of claw heads 194 in position to engage forward shoulder 168a of retention knob 168. Further similar movement of spindle drawbar 172 assures that engagement post 130, and with it face driver 102 and adapter ring 114, are pulled firmly toward hub 113, thereby firmly engaging the two annular tooth sets.

On the other hand, when chuck jaw 174 is pushed out toward the front of hub 113 by the reverse action of spindle drawbar 172, so that claws 184 are no longer held captured within bore rear portion 142, claws 184 pivot outwardly under the force of wave spring 188, thereby releasing retention knob 168 when jaw 174. This allows engagement post 130 to be withdrawn from stepped bore 142/144, allowing uncoupling and removal of face driver 102 from the lathe.

As already noted, engagement post 130 has multiple functions in carrying out face-driver coupling which is not only very quick but also very accurate in final centering along the spindle axis. More specifically, during coupling of the face-driver assembly of this invention, as the chuck-related engagement function described above is about to occur, prealignment shaft 196 (see FIGURE-5) cooperates with bore front portion 144 of hub 113 to put the structures in relative positions which thereupon facilitate highly accurate centering movements. Bore front portion 144 is sometimes referred to herein as "prealignment bore 144."

Prealignment shaft 196 and bore front portion (or prealignment bore) 144 of hub 113 are cylindrical in the embodiments of the present invention shown in the drawings. Prealignment shaft 196 and prealignment bore 144 are sized to be closely complementary (in axial cross-section). As indicated above, "closely complementary" refers to similar axial cross-sectional shapes such that, upon starting the coupling of face driver 102 with lathe 10, prealignment shaft 196 of engagement post 130 may readily be inserted into prealignment bore 144 without tool assistance, but that, once prealignment shaft 196 has entered prealignment bore 144, there is little or no visible off-axis play.

As noted above, there may be slight off-axis play, but prealignment shaft 196 and prealignment bore 144 (i.e., bore front portion 144) should be sized such that the prealignment effected by insertion of prealignment shaft 196 into prealignment bore 144 will succeed in facilitating appropriate meshing of the drive teeth and driven teeth of the two annular tooth sets, the interengagement of which will then provide final accurate centering.

In the preferred embodiment illustrated in FIGS. 2–7, the outer diameter of prealignment shaft 196 is approximately 0.015 inch smaller than the inner diameter of bore front portion 144. This provides excellent prealignment and easy insertion, and leads to automatic, highly-accurate centering of face driver 102 on the axis of spindle 26.

Prealignment shaft 196 of engagement post 130, in addition to guiding retention knob 168 into a generally central position within stepped bore 142/144, helps avoid damage to either hub 113 or engagement post 130 during coupling and uncoupling. But, most importantly, during coupling, the prealignment which the preliminary cooperation of structures provides in fact assures the fully-centered quick coupling which is desired.

In the assembled and coupled condition shown in FIGS. 3 and 4, face-driver assembly 100 can be used to drive workpiece 216 in a lathe 10 as illustrated in FIG. 1. Face-driver assembly 100 could also be used in a grinder, a hobbing machine or just about any other machining device involving rotating workpieces.

After face driver 102 is mounted using face-driver assembly 100, use of face driver 102 with workpieces is as with other mounted face drivers of the prior art. A workpiece 216 is positioned between tailstock 214 and the front end of face driver 102, and tailstock 214 is then driven by piston 218 toward face driver 102 to clamp the workpiece in place.

Workpiece centering takes place when spring-loaded centerpoint 132 of face driver 102 engages a hole preformed in the end face of the workpiece, thereby establishing the precise axis of rotation. Centerpoint 132 retracts against its spring 204 and, upon further movement of tailstock 214 toward face driver 102, drivepins 134 contact the end face of workpiece 216 and adjust themselves to its surface. Further movement of tailstock 214 toward face driver 102 causes drivepins 134 to penetrate the end face of the workpiece, thus completing the clamping operation. Face driver 102 can now be rotated by spindle 26 to rotate workpiece 216 for machining operations.

When a machining run on workpieces of one kind is completed and it is time to machine workpieces of a different size, it may be necessary to change face drivers to accommodate the new workpieces. For example, a larger face driver may be necessary to accommodate a larger workpiece. Face driver 102, which has been in use, is removed along with its adapter ring 114 by initiating axial movement of spindle drawbar 172 and actuating pin 170 under the control hydraulic actuator 104. This axial movement releases retention knob 168 from chuck jaw 174, allowing easy manual removal of face driver 102.

A replacement face driver, referred by the same identifying numeral (102), is then obtained. Like the previous face driver, such face driver already has its own adapter ring, and such face driver and adapter ring have been precentered on one another by centering screws 154. Engagement post 130 of second face driver 102 is then inserted into stepped bore 142/144 of hub 113 and this involves insertion of prealignment shaft 196 into bore front portion 144.

Thereupon, the axial retracting movement of spindle drawbar 172, under the action of hydraulic actuator 104 (when it is activated), causes chuck jaw 174 to be fully drawn into bore-rear portion 142. This causes jaw 174 to securely grip retention knob 168 and draw adapter ring 114, with its annular set of driven teeth 158, into firm engagement with hub 113, with its annular set of drive teeth 160. By virtue of the unique structures described above, the engagement of the driving and driven annular tooth sets will be a proper meshing engagement, which then allows the final accurate self-centering as coupling procedures are completed.

Such face-driver change is accurately performed in seconds, rather than in a great many minutes or even an hour or more, as with face-plate changes in the past.

Figure 8:
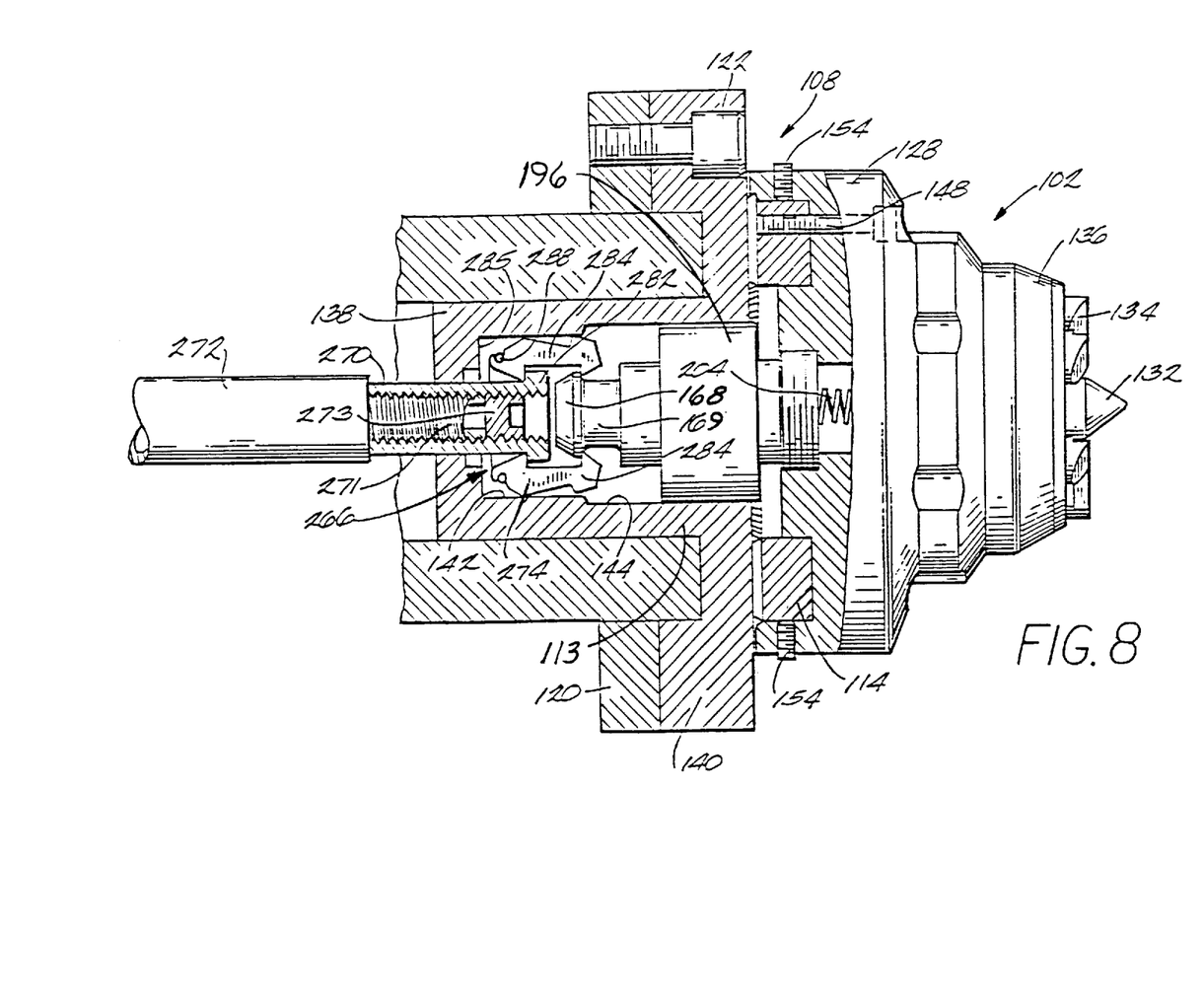
FIG. 8 is an enlarged side elevation similar to FIG. 4, but illustrating a somewhat different type of chuck.

Many changes and modifications can be made without departing from the spirit of this invention. Chuck 166, which is of a type manufactured by ITW Woodworth, of Detroit, Mich. and sold for tool holders under the "QCS" trademark, could be replaced with another chuck or other suitable coupling-and-drawing connection. One alternative is chuck 266 as illustrated in FIG. 8. Chuck 266 is of a type manufactured by Advanced Machine and Engineering Co., of Rockford, Ill. and sold for tool holders.

As in the apparatus of FIGS. 2–7, chuck 266 shown in FIG. 8 can be used with adapter 108 and retention knob 168 of face-driver assembly 100. Chuck 266 has an actuating pin 270 and a chuck jaw 274. Actuating pin 270 has a rear end receiving a threaded end 271 of a spindle drawbar 272 and is locked to spindle drawbar 272 by a lock screw 273. Actuating pin 270 has a front end which supports chuck jaw 274 and terminates in an enlarged head 282. Chuck jaw 274 is formed from claws 284 which are mounted in a recess 285 behind head 282 of actuating pin 270. Claws are biased toward an open position by a circular spring 288.

As with the apparatus of FIGS. 2–7, operation of chuck jaw 274 involves the latter stages of the coupling of a face driver with a lathe or similar device. After insertion of prealignment shaft 196 into bore front portion 144, which is the larger-diameter portion of stepped bore 142/144, chuck jaw 274 operates vis-a-vis retention knob 168.

Chuck jaw 274 closes when it is drawn fully into reduced-diameter bore rear portion 142 of stepped bore 142/144, which occurs when actuating pin 270 is moved rearwardly by spindle drawbar 272. Chuck jaw 274 then grips and pulls retention knob 168, drawing face driver 102 toward hub 113, adapter ring 114 into contact with hub 113, and the annular tooth sets into proper meshing engagement to allow the final accurate self-centering as coupling is completed.

In uncoupling, chuck jaw 274 opens under the force of spring 288 to release retention knob 168 when actuating pin 270 moves chuck jaw 274 forwardly beyond bore rear portion 142. This allows withdrawal of prealignment shaft 196 from bore front portion 144, and manual removal of face driver 102 from lathe.

Many other variations, changes and modifications can be made without leaving the scope of the invention.

For example, adapter ring 114 could be secured to flange member 128 in other ways. And the relative axial alignment of adapter ring 114 and flange member 128, and/or pre-adjustment to such relative axial alignment, could be accomplished by ways other than as illustrated in the drawings.

Or, adapter ring 114, including its rearward-facing annular set of teeth 158, could be integrally formed with flange member 128 (i.e., on flange member 128). Such integral formation would be in a manner so that such annular tooth set on the face driver is precisely concentric thereon, rather than attached and then adjusted into proper alignment by centering screws or other pre-adjustment means.

Hub 113 could be secured to the forward end of spindle drive tube 106 in other ways. Or, hub 113 could even be integrally formed with spindle drive tube 113, simplifying the structure.

Engagement post 130 may be attached to post 130 in ways other than the threaded attachment which is shown and described.

Prealignment shaft 196 and prealignment bore 144, instead of both being cylindrical, could be of other acceptable, generally complementary shapes. In some of such situations, indexing for repeatable identical meshing of the annular tooth sets might be a further function accomplished by such complementary shapes, thus eliminating a need for dowel 162 and dowel-receiving aperture 164 on the annular tooth sets.

With any or all of these or other variations, including the integral formation of certain parts with others, the same sequence of cooperative coupling actions would occur to provide quick coupling with automatic, highly-accurate centering of face drivers on the axis of the spindle.

While the principles of this invention have been described in connection with specific embodiments, it should be understood clearly that these descriptions are made by way of example and are not intended to limit the scope of the invention.

I claim:

1. A face-driver assembly for removable coupling of a face driver with a spindle of a rotary-drive machining device along the spindle axis, comprising:
    a face driver having forward and rear ends;
    a hub on the spindle and defining a prealignment bore;
    a pair of annular, self-centering coacting tooth sets, one set on the hub and one set on the face driver;
    an engagement post extending rearwardly from the face driver and forming a prealignment shaft which is closely complementary to the prealignment bore allowing insertion of the prealignment shaft into the prealignment bore; and
    interengageable means on the hub and engagement post to releasably hold and draw the engagement post rearwardly, thus drawing the prealignment shaft further into the prealignment bore to join the tooth sets to facilitate final accurate centering;
thereby facilitating quick face-driver mounting with final accurate centering of the face driver for accurate torque transmission to a workpiece held by the face driver.

2. The face-driven assembly of claim 1 wherein the face-driver tooth set is on an adapter ring which is secured to the face-driver rear end and pre-centered on the face driver.

3. The face-driver assembly of claim 2 wherein the adapter ring has an outer periphery and a plurality of pre-centering adjustment screws extending radially through the face driver to engage the outer periphery of the adapter ring.

4. The face-driver assembly of claim 1 wherein:
    the holding/drawing means on the engagement post is a retention knob at the end of the engagement post; and
    the holding/drawing means on the hub includes a jaw-type chuck for releasable engagement with the retention knob.

5. The face-driver assembly of claim 4 wherein the spindle includes a spindle drawbar and a hydraulic actuator, and the chuck is secured to the spindle drawbar and axially movable by the hydraulic actuator during coupling and uncoupling of the face-driver assembly.

6. The face-driver assembly of claim 1 wherein the prealignment shaft is adjacent to the face-driver rear end.

7. The face-driver assembly of claim 6 wherein the holding/drawing means on the engagement post is rearward of the prealignment shaft.

8. The face-driver assembly of claim 7 wherein the spindle includes a spindle drive tube having a front end and wherein the hub comprises:
    an annular hub front portion which engages the drive-tube front end;
    a center hub recess portion extending rearwardly from the hub front portion and having a stepped axial bore receiving the engagement post, the stepped bore including (a) the prealignment bore, such prealignment bore being open at the hub front portion to receive the prealignment shaft, and (b) a bore rear portion rearward of and adjacent to the prealignment bore, such bore rear portion being of smaller diameter than the prealignment bore and configured to receive the holding/drawing means of the engagement post.

9. The face-driver assembly of claim 8 wherein:
    the holding/drawing means on the engagement post is a retention knob at the end of the engagement post, the retention knob being axially movable in the stepped bore, including the bore rear portion;

the holding/drawing means on the hub is a jaw-type chuck for releasable engagement with the retention knob, the chuck configured for insertion into the stepped bore, including the bore rear portion; and the chuck, bore rear portion and retention knob being configured and arranged such that the chuck closes onto the retention knob as the chuck moves into the bore rear portion, is held closed by its confinement within the bore rear portion, and opens as the chuck moves from the bore rear portion into the prealignment bore.

10. The face-driver assembly of claim 9 wherein the spindle further includes a spindle drawbar within the spindle drive tube and a hydraulic actuator, and the chuck is secured to the spindle drawbar and axially movable by the hydraulic actuator during coupling and uncoupling of the face-driver assembly.

11. The face-driver assembly of claim 10 wherein the face-driver tooth set is on an adapter ring which is secured to the face-driver rear end and pre-centered on the face driver.

12. The face-driver assembly of claim 11 wherein the adapter ring has an outer periphery and a plurality of pre-centering adjustment screws extending radially through the face driver to engage the outer periphery of the adapter ring.

13. A face-driver assembly for removable coupling of a face driver with a spindle of a rotary-drive machining device along the spindle axis, comprising:

a face driver having a rear end;

a pair of self-centering tooth sets, one set secured with respect to the face-driver rear end and the other set secured with respect to the spindle;

a closely-complementary prealignment member and pre-alignment receptacle, one secured with respect to the face-driver rear end and the other secured with respect to the spindle allowing insertion of the prealignment member into the prealignment receptacle; and releasably interengageable means, including one portion secured with respect to the face-driver rear end and a second portion secured with respect to the spindle, to releasably hold and draw the face driver rearwardly after the prealignment member is inserted in the prealignment receptacle, thus drawing the prealignment member further into the prealignment receptacle to join the tooth sets to facilitate final accurate centering;

thereby facilitating final accurate face-driver centering for accurate torque transmission to a workpiece held by the face driver.

14. A method for changing face drivers used on rotary-drive machining devices which have spindles for rotating workpieces, comprising:

providing, pre-installed on the spindle, a hub defining a prealignment bore, the hub having a first annular tooth set thereon and a first releasable coupling means;

providing, pre-installed on each face driver, (a) a second annular tooth set which is self-centering on the first tooth set, (b) an engagement post which extends rearwardly from the face-driver for insertion into the hub and forms a prealignment shaft closely complementary to the prealignment bore, and (c) a second releasable coupling means engageable with the first coupling means;

disengaging the first coupling means from the second coupling means of a first such face driver;

withdrawing the engagement post from the hub in removing the first face driver;

inserting the engagement post of a second such face driver into the hub by inserting the prealignment shaft of the second face driver into the prealignment bore, thereby to prealign the second face driver with the spindle;

engaging the first coupling means with the second coupling means of the second face driver;

drawing the engagement post rearwardly, thus drawing the prealignment shaft further into the prealignment bore thereby to join the tooth sets in a manner facilitating final accurate centering of the second face driver on the axis of the spindle.

15. The method of claim 14 wherein the disengagement, engagement and drawing steps include activating a hydraulic actuator to axially move the first and second coupling means via a spindle drawbar.

16. A coupling assembly for removable coupling of a workpiece-holder with a spindle of a rotary-drive machining device along the spindle axis, comprising:

a workpiece-holder having forward and rear ends;

a hub on the spindle and defining a prealignment bore;

a pair of annular, self-centering coacting tooth sets, one set on the hub and one set on the workpiece-holder;

an engagement post extending rearwardly from the workpiece-holder and forming a prealignment shaft which is closely complementary to the prealignment bore allowing manual insertion of the prealignment shaft into the prealignment bore; and interengageable means on the hub and engagement post to releasably hold and draw the engagement post rearwardly, thus drawing the prealignment shaft further into the prealignment bore to join the tooth sets to facilitate final accurate centering;

thereby facilitating quick workpiece-holder mounting with final accurate centering of the workpiece-holder for accurate torque transmission to a workpiece held by the workpiece-holder.

* * * * *